(12) United States Patent
Forman et al.

(10) Patent No.: US 7,437,338 B1
(45) Date of Patent: Oct. 14, 2008

(54) PROVIDING INFORMATION REGARDING A TREND BASED ON OUTPUT OF A CATEGORIZER

(75) Inventors: George H. Forman, Port Orchard, WA (US); Henri J. Suermondt, Sunnyvale, CA (US); Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 241 days.

(21) Appl. No.: 11/386,005

(22) Filed: Mar. 21, 2006

(51) Int. Cl.
*G06E 1/00* (2006.01)
*G06E 3/00* (2006.01)
*G06F 15/18* (2006.01)
*G06G 7/00* (2006.01)

(52) U.S. Cl. ....................................................... 706/20
(58) Field of Classification Search ........................ None
See application file for complete search history.

(56) References Cited

U.S. PATENT DOCUMENTS

| | | | |
|---|---|---|---|
| 5,819,258 A | 10/1998 | Vaithyanathan et al. | |
| 5,930,764 A * | 7/1999 | Melchione et al. | 705/10 |
| 5,943,670 A | 8/1999 | Prager | |
| 6,038,560 A | 3/2000 | Wical | |
| 6,170,025 B1 * | 1/2001 | Drottar et al. | 710/48 |
| 6,173,279 B1 * | 1/2001 | Levin et al. | 707/5 |
| 6,701,333 B2 | 3/2004 | Suermondt et al. | |
| 6,704,905 B2 | 3/2004 | Fukushige et al. | |
| 6,728,690 B1 | 4/2004 | Meek et al. | |
| 6,767,213 B2 * | 7/2004 | Fleishman | 434/236 |
| 6,823,323 B2 * | 11/2004 | Forman et al. | 706/20 |
| 6,842,751 B1 | 1/2005 | Vilalta et al. | |
| 6,944,616 B2 | 9/2005 | Ferguson et al. | |
| 6,973,452 B2 * | 12/2005 | Metzger et al. | 707/4 |
| 7,043,492 B1 | 5/2006 | Neal et al. | |
| 7,113,957 B1 | 9/2006 | Cohen et al. | |
| 7,177,855 B2 | 2/2007 | Witkowski et al. | |
| 2002/0107712 A1 | 8/2002 | Lam et al. | |
| 2003/0187809 A1 | 10/2003 | Suermondt et al. | |
| 2004/0064464 A1 | 4/2004 | Forman et al. | |
| 2005/0096866 A1 | 5/2005 | Shan et al. | |
| 2006/0173559 A1 | 8/2006 | Kirshenbaum et al. | |
| 2006/0248054 A1 | 11/2006 | Kirshenbaum et al. | |
| 2007/0185901 A1 | 8/2007 | Gates | |

FOREIGN PATENT DOCUMENTS

EP 0747846 A 12/1996

OTHER PUBLICATIONS

Forman et al., U.S. Appl. No. 11/364,108, entitled "Identifying an Emerging or New Category," filed, Feb. 28, 2006, pp. 1-34, Figs. 1-6.

(Continued)

*Primary Examiner*—Michael B Holmes

(57) ABSTRACT

In response to a query relating to a category, identify at least one case. An indication is received regarding whether the at least one case belongs to the category. A categorizer is trained based on the received indication. Cases from a data set are allocated into plural bins. For respective bins, quantification measures are computed for cases belonging to the category based on output from the categorizer. Information is provided regarding a trend of the category over the plural bins based on the computed quantification measures.

23 Claims, 8 Drawing Sheets

OTHER PUBLICATIONS

G. Forman, U.S. Appl. No. 10/902,924, entitled "System and Method for Category Discovery," filed Jul. 30, 2004, pp. 1-38, Figs. 1-7D.

Kirshenbaum et al., U.S. Appl. No. 11/080,098, entitled "A Method of, and System for, Classification Count Adjustment," filed Mar. 14, 2005, pp. 1-31, Figs. 1A-5.

Kirshenbaum et al., U.S. Appl. No. 11/118,178, entitled "Providing Training Information for Training a Categroizer," filed Apr. 29, 2005, pp. 1-39, Figs. 1-3E.

Kirschenbaum et al., U.S. Appl. No. 11/118,786, entitled "Computing a Quantification Measure Associated with Cases in a Category," filed Apr. 29, 2005, pp. 1-35, Figs. 1-3D.

Kirshenbaum et al., U.S. Appl. No. 11/172,187, entitled "Effecting Action to Address an Issue Associated with a Category Based on Information that Enables Ranking of Categories," filed Jun. 30, 2005, pp. 1-52, Figs. 1-5H.

Kirshenbaum et al., U.S. Appl. No. 11/211,979, entitled "Producing a Measure Regarding Cases Associated with an Issue After One or More Events Have Occurred," filed Aug. 25, 2005, pp. 1-51, Figs. 1-5H.

J.Z. Shan, U.S. Appl. No. 11/119,037, entitled "Detecting Change in Data," filed Apr. 29, 2005, pp. 1-26, Figs. 1-6.

J.Z. Shan, U.S. Appl. No. 11/117,989, entitled "Performing Quality Determination of Data," filed Apr. 28, 2005, pp. 1-32, Figs. 1-9.

Kirshenbaum et al., U.S. Appl. No. 11/047,093, entitled "Methods and Systems for a Prediction Model," filed Jan. 31, 2005, pp. 1-29, Figs. 1-6.

J.Z. Shan, U.S. Appl. No. 11/118,832, entitled "Determining a Time Point Corresponding to a Change in Data Values Based on Fitting with Respect to Plural Aggregate Value Sets," filed Apr. 29, 2005, pp. 1-26. Figs. 1-8.

G.H. Forman et al., U.S. Appl. No. 11/393,487, entitled "Comparing Distributions of Cases Over Groups of Categories," filed Mar. 30, 2006, pp. 1-39, Figs. 1-7E.

Office Action dated Oct. 16, 2007 from U.S. Appl. No. 11/118,178, 53 pages.

Office Action dated Sep. 18, 2007 from U.S. Appl. No. 11/118,786, 22 pages.

* cited by examiner

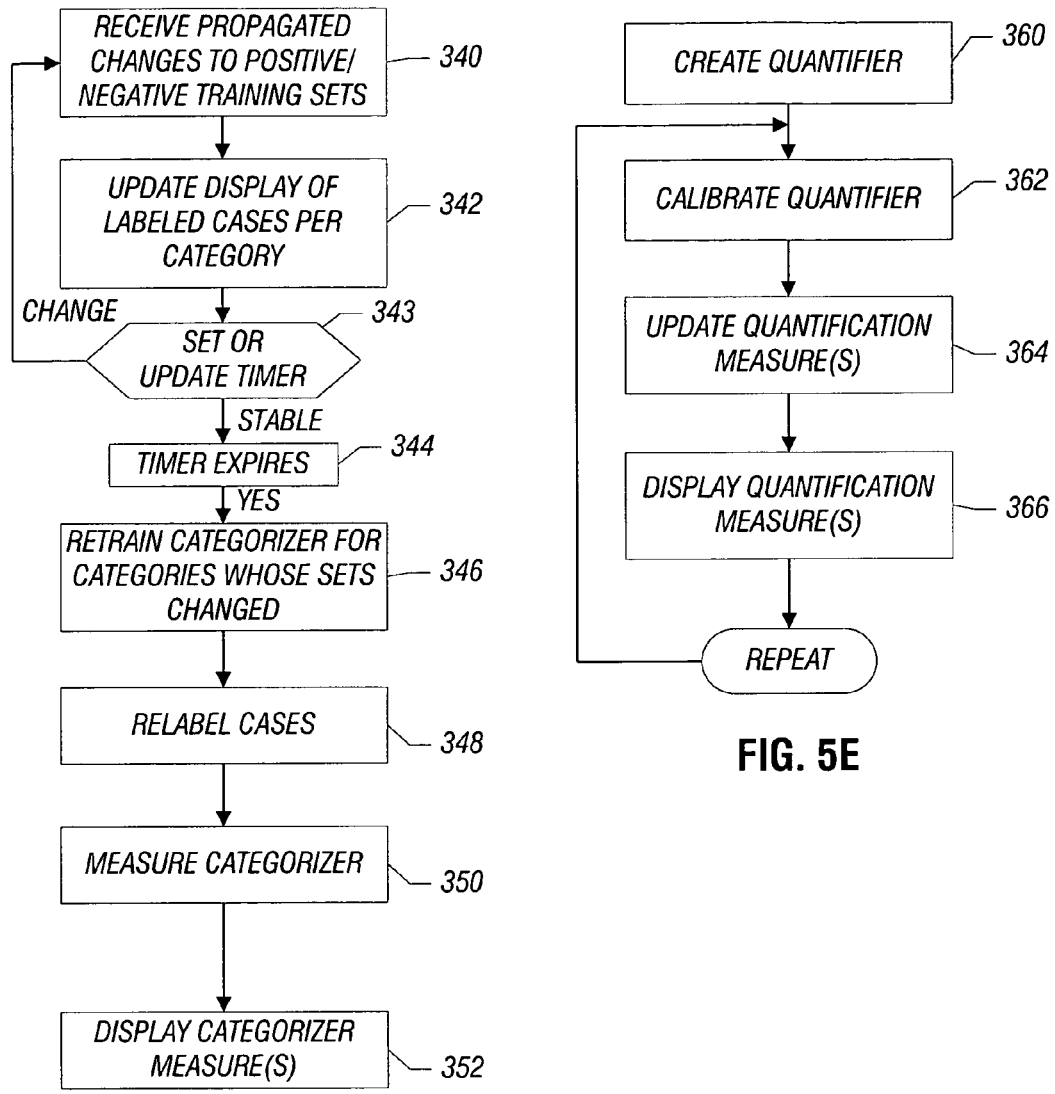

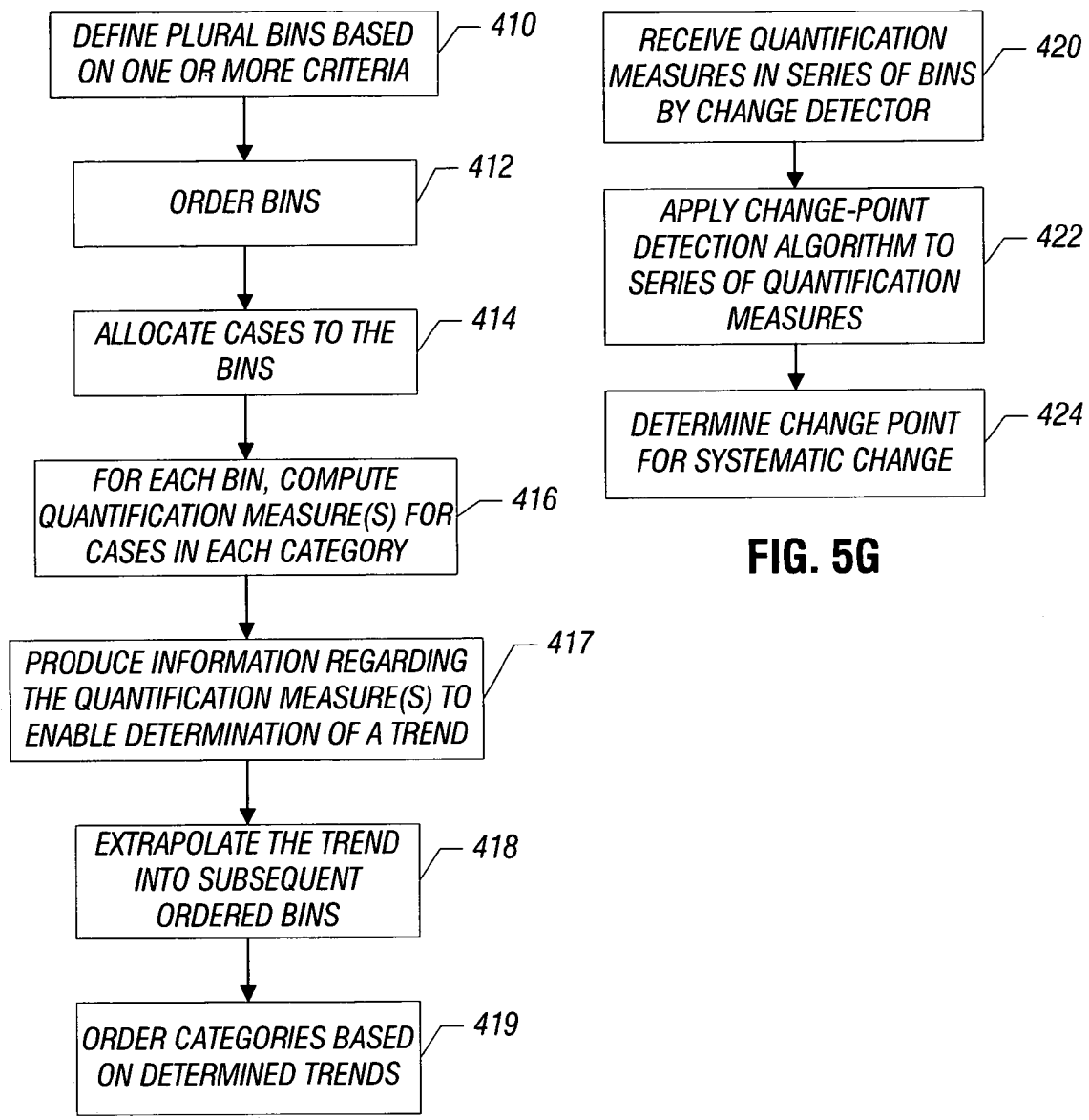

PROVIDING INFORMATION REGARDING A TREND BASED ON OUTPUT OF A CATEGORIZER

BACKGROUND

Whenever an organization (such as a business organization, educational organization, or government organization) is involved in providing services to customers or other users, various issues, such as problems, tend to arise. For example, whenever a new product is introduced into a market, some users will encounter difficulties due to actual defects of the product or due to users being unable to figure out how to properly use the product. In this example, two types of problems exist: a defect in the product; and lack of information provided to the user regarding use of the product. Typically, several problems can be associated with products or services provided by an organization.

To address problems associated with products or services, an organization may identify one or more of the problems that the organization deems to be the most important, and allocate resources to discover the underlying causes and come up with solutions for the one or more problems. As examples, the fixes that can be implemented can take the form of redesigning a product, implementing a fix of a current product, introducing new documentation or modifying documentation for customers, providing on-line support documentation, and so forth.

Conventional mechanisms and techniques typically do not enable efficient analysis of problems. Usually, the analysis of a problem is performed manually to determine whether the problem should be addressed. Such manual analysis can be time consuming and prone to error.

BRIEF DESCRIPTION OF THE DRAWINGS

Some embodiments of the invention are described with reference to the following figures:

FIGS. 5A-5G are flow diagrams of processes performed by the analysis tool according to an embodiment.

DETAILED DESCRIPTION

Figure 1:
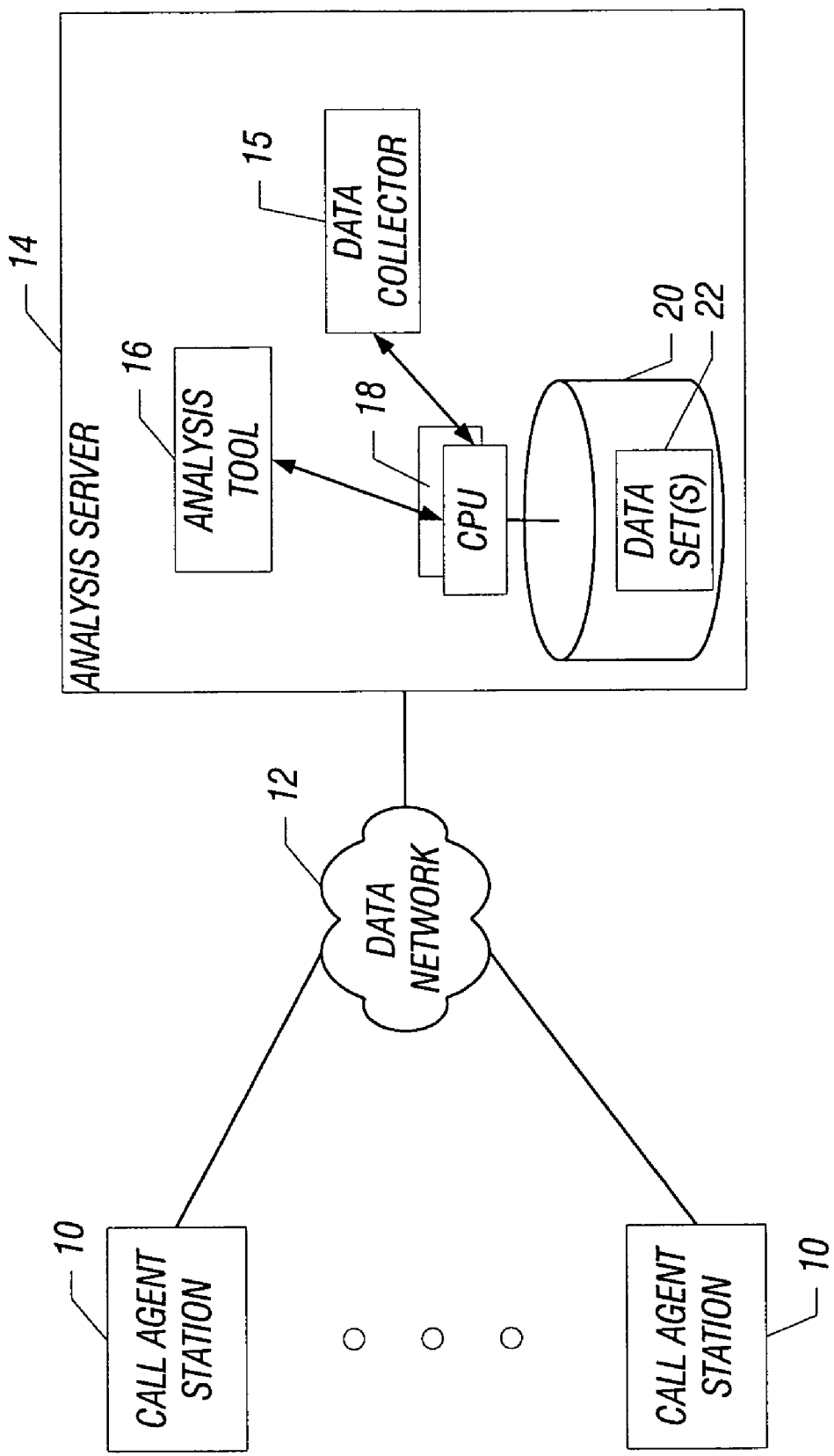
FIG. 1 is a block diagram of a network that includes call agent stations coupled to an analysis server, according to an embodiment.

FIG. 1 illustrates nodes coupled to a data network 12, where the nodes include call agent stations 10 and an analysis server 14. In the example of FIG. 1, the call agent stations 10 are associated with call agents (such as support personnel) in a customer support organization. The call agent stations 10 communicate over the data network 12 to the analysis server 14. As call agents receive calls from customers, information pertaining to the calls is entered by the call agents into the call agent stations 10. The entered information is communicated over the data network 12 to the analysis server 14 (which can be a computer or multiple computers), where a data collector 15 stores the information in one or more data sets 22.

Alternatively, the call agent stations 10 can be replaced with self-help servers, such as self-help servers that provide web pages accessible by customers seeking help with respect to various issues. The self-help servers are able to prompt such customers to enter information regarding the issue(s) they are facing. The information entered by customers is collected and communicated to the analysis server 14 for storing in the one or more data sets 22.

The one or more data sets 22 are stored in a storage 20. The storage 20 can be persistent storage (such as magnetic or optical disk drives or non-volatile semiconductor memory devices), volatile memory (such as dynamic random access memories or static random access memories), or other types of storage devices. The storage 20 is connected to one or plural central processing units (CPUs) 18 in the analysis server 14. Alternatively, the one or more data sets 22 are stored on a database system separate from the analysis server 14.

The data collector 15 is executable on the one or plural CPU(s) 18. Also, as depicted in FIG. 1, the analysis server 14 includes an analysis tool 16 that is also executable on the CPU(s) 18. The analysis tool 16 performs analysis of the information contained in the data set(s) 22 stored in the storage 20. The information in the data set(s) 22 is collected as individual cases or incidents associated with calls received by call agents at call agent stations 10. A "case" or "incident" refers to a data item that represents a thing, event, or some other item. Each case or incident is associated with predefined information (e.g., product description, summary of problem, time of event, and so forth). The terms "case" and "incident" are used interchangeably herein.

In the customer support context, a "case" represents an instance of an interaction between a customer (e.g., a user, patron, subscriber, visitor, member, employee, participant, constituent, supplier, partner, etc.) and an organization (e.g., company, manufacturer, store, provider, employer, representative, etc.) that is indicative of satisfaction or dissatisfaction with something at least partially under control of the organization or another party the organization represents, A "category" (e.g., problem, issue, concern, etc.) represents an underlying reason for the interaction (such as satisfaction or dissatisfaction that led to the case), Such categories can reflect problems associated with a product or service (e.g., defects in product design or manufacture, hardware problems, software problems, hard disk problems, battery problems, and so forth), difficulties in understanding how to correctly use a product or service, difficulty obtaining a product or service, difficulty obtaining information about a product or service, concerns about the value of a product or service, desires for features lacking in a product or service, poor experience interacting with the organization, and so forth. Other organization/customer relationships (e.g., employer/employee, government/constituent) will have similar sets of categories reflecting the types of concerns the customers have and the types of control the entities have. In other environments, other types of categories are employed.

Although described in the context of a customer support environment that includes call agents receiving calls at call agent stations, other embodiments of the invention are applicable to other types of systems for other types of organizations (e.g., educational organizations, government organizations, business organizations, financial organizations, and so forth). Also, another embodiment is applicable to customers interacting with the organization directly by entering information through a website or through an automated telephone entering system.

In accordance with some embodiments, the analysis tool 16 in the analysis server 14 is an interactive analysis tool that allows a user to interact with the analysis tool 16 for the purpose of identifying categories relevant for the cases contained in the data set(s) 22. The analysis tool 16 also enables the identification of a trend for one or more identified categories. Trend analysis allows an organization or user to identify categories associated with quantification measures (e.g., total call volume, support cost, etc.) that are increasing or decreasing due to some event (e.g., new product or service release, occurrence of a product defect, holiday, third party software or hardware releases, and so forth). A "quantification measure" includes (1) a quantity of cases in each category; or (2) an aggregate (e.g., sum, average, maximum, minimum, etc.) of a data field (e.g., cost of parts or time to resolve the case) associated with each of the cases in the respective category. The term "quantification measure" is used interchangeably with the term "metric," and refers to any measure that is aggregated from values representing any aspect of cases that are being analyzed. A "trend" of a category refers to the increasing or decreasing tendency or direction of a given quantification measure associated with cases of the category over some criterion (e.g., time, location, altitude, etc.). Trend can also refer to the given quantification measure staying stable (in other words, not increasing or decreasing). As used here, a trend need not be monotonic (strictly increasing or decreasing). The trend may be a general statistical increase or decrease represented, for example, by an upward or downward sloping moving average.

By analyzing the trend of a category, or plural categories, the organization or user can determine whether issue(s) associated with the category(ies) is (are) worsening or improving (or more generally, changing), and whether some action should be taken with respect to the category (or categories) to reduce the quantification measure(s) associated with the category (or categories). For example, an increase in technical support calls about battery problems can be caused by a problem associated with the supplier of the battery. The increase in the number of technical support calls on a specific issue represents an upward trend that is an indication that the problem is worsening. Worsening or improving trends of an issue can be indicated by either increasing or decreasing quantification measure(s), or alternatively, by changes in other parameters of a model of the quantification measure(s) over time such as changes in periodicity or seasonality. The analysis of the trend can also just focus on a particular time window (such as between a starting time or date and an ending time or date).

Tracking a trend of a category (or plural categories) also allows for an organization or user to determine whether an action taken with respect to a category has resulted in a decrease (or other change) in the measured quantification measure(s) associated with the category. For example, if the battery problem has been resolved by asking the supplier to implement a fix, then the technical support call volume can be monitored to determine whether the call volume is trending downwardly. Another quantification measure that can be monitored is frequency of calls with respect to a category (e.g., frequency of calls pertaining to the battery problem). The frequency of calls can be measured with respect to total number of calls received for all categories, or total number of products sold. The trend analysis can thus provide a return-on-investment indication of whether an action taken with respect to a category has resulted in a reduction of a quantification measure being monitored for the category.

The interactive analysis tool 16 provides an automated mechanism for performing the trend analysis. Also, the output provided by the analysis tool 16 with respect to the trend for a particular category (or categories) can be in an easy-to-read format (e.g., graph, table, etc.) that allows a user (or users) to quickly determine the trend of the category (or categories). Information pertaining to the trends of multiple categories can be presented side-by-side in the output so that a comparison can be made of the trends of multiple categories.

The analysis tool 16 also performs detection of whether a "systematic" change has actually occurred with respect to a given category. Note that as part of a normal business process, a quantification measure (e.g., total call volume, call frequency, etc.), tends to fluctuate due to various normal business factors (seasonal effects, business trends, and so forth). The fluctuation of the quantification measure during normal operation does not necessarily indicate that a systematic change has occurred with respect to a category that warrants allocation of resources to address the issue associated with the category. Rather, a systematic change results from a change that is caused by an underlying change in a product, service, or other aspect of an organization, rather than from changes due to normal operation of the system (e.g., seasonal fluctuations, business trend fluctuations, a change in the number of units sold or in the number of units under contract such as warranty, etc.). Examples of underlying change that can cause a systematic change include product hardware or software defects, poor documentation, and so forth.

In accordance with some embodiments, the analysis tool 16 includes a change detector to detect for a systematic change in the category based on the observed trend of a quantification measure (or plural quantification measures) associated with the category. The change detector in the analysis tool 16 allows for even more efficient and accurate determination of whether a trend of a particular category is actually increasing (such as in response to occurrence of a product/service defect) or decreasing (such as in response to a fix implemented with respect to a product/service defect). The change detector is able to identify the point at which (or close to which) a systematic change has occurred so that a user is better able to distinguish between a change due to normal operation or a systematic change caused by an issue that should be addressed.

The analysis tool 16 also includes a search-and-confirm mechanism according to some embodiments that enables the creation of training cases, based on user input (described further below), for the purpose of training a categorizer or plural categorizers in the analysis tool 16. Note that the cases stored in the data set(s) 22 include unlabeled cases (cases that are not initially identified with any particular category or categories) as well as labeled cases (cases that have been labeled as belonging to a category or plural categories).

Figure 2A:
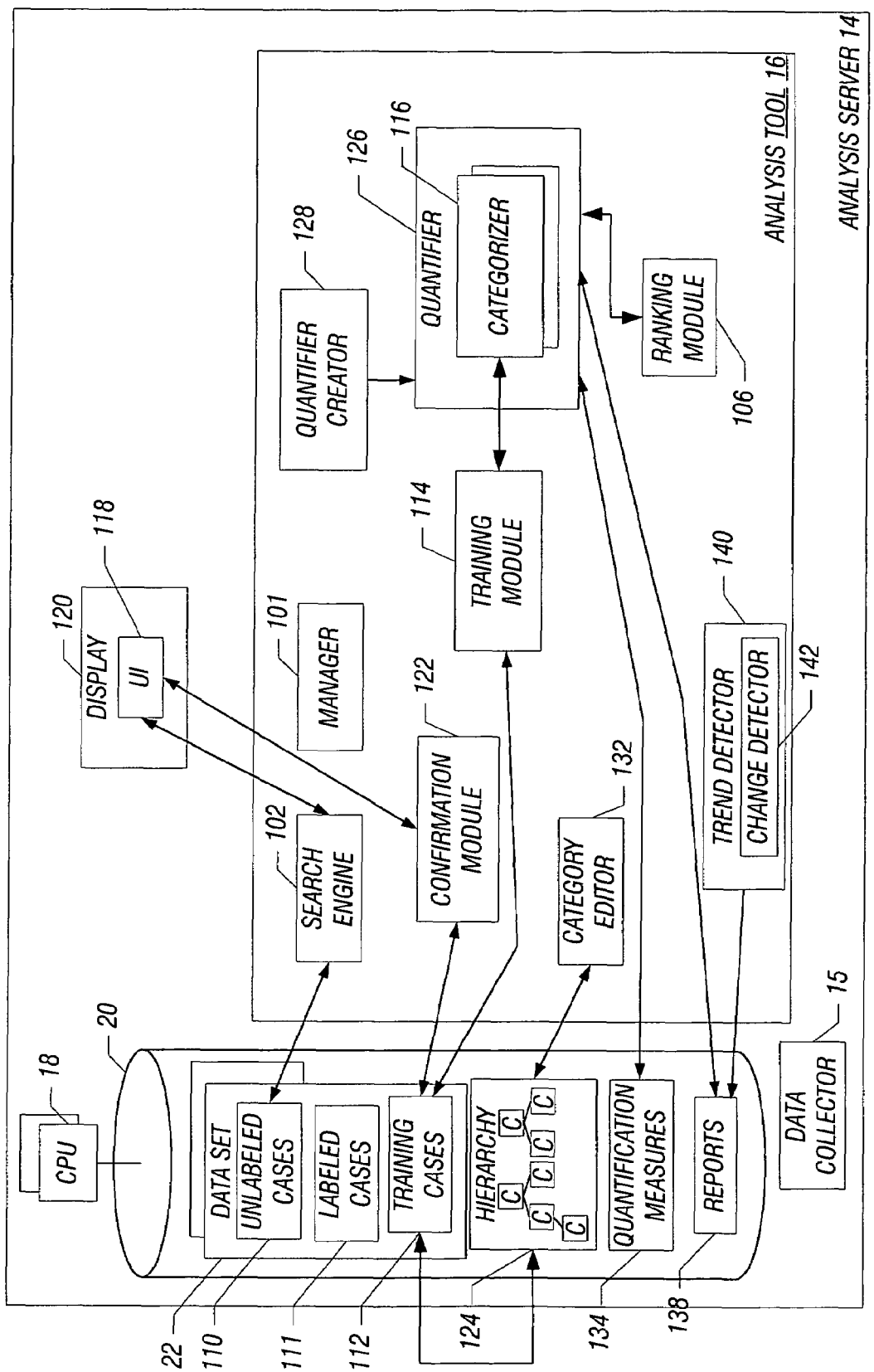
FIG. 2A is a block diagram of the analysis server of FIG. 1 that incorporates an analysis tool according to an embodiment.

FIG. 2A illustrates the components of the analysis tool 16 and content of the storage 20 in accordance with an embodiment, in greater detail. The analysis tool 16 contains various modules according to some embodiments of the invention that are executable on the CPU(s) 18. One module in the analysis tool 16 is a quantifier 126, which performs quantification of cases associated with a particular issue. "Quantification" refers to the computation of one or more quantification measures.

In accordance with some embodiments, another module in the analysis tool 16 is a trend detector 140 that is executable to analyze quantification measures computed with respect to a category (or plural categories). The trend detector 140 is able to provide an output of the trend detected for a category (or plural categories). An example output is in the form of the graphs depicted in the chart of FIG. 4, described in further detail below.

In accordance with some embodiments, the trend detector 140 defines multiple bins based on one or more criteria. As examples, the one or more criteria include a time criterion, a product type criterion, a product number criterion, a product age criterion, a size criterion, a speed criterion, a cost criterion, a warranty type criterion, a customer type criterion, a customer interaction type criterion, an altitude criterion, a temperature criterion, a humidity criterion, another atmospheric condition (e.g., pressure) criterion, a location criterion, a usage criterion (e.g., number of pages printed, mileage, number of landings), a customer income level criterion, a purchase price criterion, or some other criterion. A "bin" refers to any grouping or collection of cases, where the grouping or collection is based on the specified criterion. Note that a particular case can be assigned to a single bin, to no bins, or to multiple bins. For example, the bins can correspond to instances of a sliding time window of a particular length (e.g., one week), which slides one day (or other unit) at a time—in this scenario, a case that occurs on a particular day can belong to seven bins. The bins can be ordered (e.g., ordered according to time, location, altitude, product number, and so forth). For each bin, a quantification measure (or multiple quantification measures) is computed for cases of each category. Note that in each bin, the quantification measure for one category is computed independently of the quantification measure for another category. In one example, a quantification measure can be the number of calls in each bin (e.g., a time window) for a given category (e.g., battery problem). A trend is then determined based on the quantification measures in multiple ordered bins. The trend is displayed as an output, such as in the chart of FIG. 4.

If the bins include time windows, then the cases (in a defined larger time period such as over the past quarter, year, or multiple years) are discretized or divided into the time windows. Each case can be associated with a time data field (e.g., time and date that a case was created or modified). The value of the time data field is used to divide the cases into the plural bins. Quantification measures for cases in respective categories are computed in each time window. For a given category, the quantification measures over multiple time windows can then be used to derive an output that depicts, visually, the trend of cases in that category over time.

The trend detector 140 also includes a change detector 142 to detect, based on the quantification measures, whether a systematic change has occurred. As discussed above, a systematic change is indicative of an underlying change (e.g., product or service defect, fix implemented for a defect, etc.) in a product, service, or some aspect of an organization that causes either an increase or decrease in the corresponding quantification measure(s). In accordance with an embodiment, the change detector 142 implements a cumulative sums (CUSUM) algorithm to detect the systematic change. The CUSUM algorithm is based on calculating cumulative sums of a particular quantification measure over time (to produce time series of quantification measures). The CUSUM algorithm is performed with respect to the time series of cumulative sums to determine when a systematic change has occurred.

Alternatively, instead of using the CUSUM algorithm, other algorithms for detecting change can be employed, such as a generalized likelihood ratio (GLR) algorithm. Other algorithms can be used in other embodiments.

The quantifier 126 in the analysis tool 16 cooperates with one or plural categorizers 116 to perform its quantification task. The categorizer(s) 116 is(are) trained by a training module 114, based on training cases 112 (including positive training sets of cases and negative training sets of cases) created based on a search-and-confirm mechanism.

The search-and-confirm mechanism performs a search-and-confirm procedure to develop the training cases 112. Training a categorizer refers to building or modifying a categorizer based on the training cases, including a positive training set of cases and a negative training set of cases for each category.

In some implementations, concurrently with the search-and-confirm procedure for the purpose of developing categorizer training cases, new categories (such as for problems faced by an organization) can be discovered or existing categories modified. As new categories are added or existing categories modified, training cases are further developed for these new or modified categories to further train the categorizer 116.

The trained categorizer 116 is then used to categorize cases of the data set(s) 22 into one or more categories. In alternative implementations, multiple trained categorizers 116 can be used to categorize cases of the data set(s) 22 into one or more categories. As the categorizer 116 categorizes cases, quantification of the cases in each category is performed by the quantifier 126.

The analysis tool 16 also includes an optional ranking module 106 that is able to identify higher priority categories based on detected trends. For example, a category can be ranked higher if a trend indicates any of the following: a strong trend upwardly or downwardly of a quantification measure associated with the category (e.g., categories associated with trends changing at a more rapid rate can be ranked higher); a sharp change in the trend; and extrapolation of the trend into subsequent ordered bins (e.g., into the future) indicates increasing magnitude of the quantification measure (e.g., future predicted values of the quantification measure based on the trend indicates an increasing problem).

Providing information to identify higher priority categories enables ranking of the categories so that an organization can properly allocate resources to more important respective categories. For example, the ranking can enable an organization to identify the top ten (or top predetermined number) problems that should be given more attention. The information identifying the higher priority categories is provided for a predetermined frame of reference, such as a predetermined time period, product line, geographic region, and so forth. In other implementations, the ranking module 106 can be omitted. Ranking the categories by the ranking module 106 enables presentation of a prioritized list of categories to a user for the user to select one of the issues from this prioritized list for the purpose of identifying a fix or other event with respect to the selected issue and for measuring an impact of the fix or other event.

Although the various modules depicted in FIG. 2A are part of one analysis tool 16, it is contemplated that, in other implementations, the modules can be implemented in multiple tools that are deployable in the analysis server 14 or even on other systems. Moreover, in some cases, the categorizer(s) 116, quantifier 126, ranking module 106, and/or trend detector 140 can be provided as an output of the analysis tool 16 for use on other data sets or for use on other systems. By being able to re-run the quantifier 126, categorizer(s) 116, and trend detector 140 on other data sets, the quantification analysis and trend detection analysis can be easily repeated daily, weekly, monthly, annually, and so forth. Note that although the categorizer(s) 116, quantifier 126, and trend detector 104 are depicted as separate modules, the modules can be integrated into a single module in other implementations. Also note that some of the modules in the analysis tool 16 can be omitted in other embodiments.

The identification of categories is performed interactively by a user of the analysis tool 16 as the user uses the search-and-confirm mechanism of the tool 16. The search-and-confirm mechanism includes a search engine 102 and confirmation module 122. The search engine 102 enables a user to submit a search and to display a list of cases matching the search criterion or criteria. With the confirmation module 122, the user is able to confirm or disconfirm whether each of the displayed cases belongs to a category (or plural categories).

The search engine 102 is able to receive a query from a user through a user interface 118, and to issue the query to identify cases from the data set(s) 22. The search engine 102 displays information regarding identified cases from among the unlabeled cases 110 that match the query. The displayed information regarding the identified cases is presented in the user interface 118. The user interface 118 can be a graphical user interface, according to an example implementation.

The information displayed in the user interface 118 by the search engine 102 in response to the query includes information regarding a subset of the unlabeled cases 110 that match search criterion(ia) (in the form of search terms or patterns) in the query. A case is said to "match" a query if any information associated with the case satisfies some criterion, such as search term, in the query. A "term" specified by a query refers to any string, substring, regular expression, glob expression, non-textual object (e.g., audio object, video object, etc.), or any other term. A "glob expression" is an expression containing an operator indicating presence of zero or more characters (e.g., *), an arbitrary character (e.g., ?), a range of characters, or a range of strings. A case matches a search term in the query if any information associated with the case satisfies the search term in any specified manner (in other words, equality between the case information and the search term is not required, since the query can specify other forms of relationships between the case information and search term). Not all cases that match need to be used. In some scenarios, a query is matched to only certain field(s) of a case, such as a case description entered by a call agent or user. The user interface 118 displays a summary of each of the matching cases to provide a user with information regarding each case. The process of specifying a query and viewing results of matching cases is referred to as a "scooping" process. Following the scooping process, a "confirming" process is performed in which a user is able to confirm whether or not each of the matching cases belongs to a particular category (by selecting or deselecting displayed fields or other indicators).

User confirmation (or disconfirmation) is monitored by the confirmation module 122. Not all displayed cases need to be confirmed or disconfirmed. For cases that have been correctly matched to a category, such cases are added to a positive training set of cases. On the other hand, for cases that have been incorrectly matched, the confirmation module 122 adds such incorrectly matched cases to a negative training set of cases. The positive and negative training sets, which are part of the training cases 112 stored in the data set 22, are accessed by the training module 114 for training the categorizer 116.

The search engine 102 and confirmation module 122 thus cooperate to develop training cases 112 from cases in the data set 22 (based on user confirmation and disconfirmation), which training cases 112 are used by the training module 114 to train the categorizer 116.

During the searching and confirming, a user can determine that additional categories should be added to a hierarchy 124 of categories, or existing categories in the hierarch 124 modified. Using a category editor 132 in the analysis tool 16, the user can move, add, modify, or even delete categories (represented by the hierarchy 124 of categories stored in a storage 20). In the example hierarchy 124 depicted in FIG. 2A, each box designated "C" represents a category. As depicted, a category can have subcategories, which also can have subcategories. As categories are added, deleted, or modified, additional training cases can be developed for each category, with the training module 114 training the categorizer 116 based on these additional training cases. Adding, deleting, or modifying categories (or subcategories) causes the positive and negative training sets of the training cases 112 to be modified.

The category editor 132 is responsive to user input at a user interface (UI) 118 (presented in a display monitor 120) to add categories (or subcategories), delete categories (or subcategories), or modify categories (or subcategories). In response to user input to add, delete, or modify categories (or subcategories), the category editor 132 is able to modify the hierarchy 124 of categories.

Note that, initially, there may already be a developed set of categories before the search-and-confirm procedure is started, which existing set of categories can be used as a starting or initial set of categories. In an alternative scenario, such as with a new project, no categories may exist. In this alternative scenario, the user may create one or a few categories as the starting point, or the one or few categories can be created by another technique, described further below.

In one embodiment, the categories in the hierarchy 124 of categories are in a directed acyclic graph (DAG) rather than a tree. In other words, any category in the hierarchy 124 can have not only several children, but also several parents. However, a category cannot be simultaneously an ancestor and a descendant of another category. Subcategories (associated with a particular category) are considered the children of the particular category. In alternative implementations, other structural relationships of categories can be employed.

A manager module 101 in the analysis tool 16 performs overall management operations, such as managing the storing of data (including training cases 112 and hierarchy 124 of categories) in the storage 20 and coordination among the various modules of the analysis tool 16.

As the positive and negative training sets are modified based on the user confirming and disconfirming acts, and based on modification of the hierarchy 124 of categories, the modified positive and negative training sets are propagated through the hierarchy 124 of categories to enable the training module 114 to train the categorizer 116 for the categories.

During development of the categorizer 116, the quantifier 126 is also created by a quantifier creator module 128 in the analysis tool 16. The quantifier 126 can be in any format, such as an Extensible Markup Language (XML) format, C code format, or any other format. In the arrangement of FIG. 1, the categorizer(s) 116 is(are) part of the quantifier 126. However, in other embodiments, the quantifier 126 and categorizer(s) 116 are separate modules. In either case, the quantifier 126 cooperates with the categorizer(s) 116 to perform automated quantification of the cases. In this manner, manual quantification (which can be time intensive, inaccurate, and expensive) is replaced with quantification by the quantifier 126.

The quantification performed by the quantifier 126 includes computing, for one or more of the categories in the hierarchy 124 of categories, a quantification measure that represents the number of cases in each category. Alternatively, the quantifier 126 is able to generate another quantification measure, such as a sum or some other aggregate of a data field associated with the cases that belong to each category. As an example, the quantification can represent a measure (e.g., sum) of one or more of the following: the duration of calls; cost of repair; amount of time to resolve the calls; amount of lost revenue; an amount of money to resolve calls; amount of lost revenue due to calls; a degree of customer aggravation; an amount of time spent by customers before initiating a call; an amount of time spent by customers during the call; an amount of time spent diagnosing or resolving cases; an amount of money spent by customers; an amount of money spent interacting with customers; an amount of money spent diagnosing or resolving the cases; and a number of customers who declined to initiate a call; and so forth. The quantification measure can be adjusted based on some secondary factor, such as number of units sold or number of units under warranty. Other examples of aggregation include an average or mean, a standard deviation, a 95% (or other percentage level) confidence interval, a variance, a minimum, a maximum, a median, a mode, a geometric mean, a harmonic mean, a percentile rank, an ordinal statistic, or other statistic of the values in the data field associated with the cases or a value computed based on fitting a model to the values in the data field associated with the cases. The data field of a case can contain a single value or a collection of values, or the data field can be a value or collection of values computed from other values associated with the case. In some embodiments the aggregate may involve a plurality of data fields associated with each case. The quantification measures computed by the quantifier 126 are stored as quantification measures 134 in the storage 20.

Note that the quantification measures computed by the quantifier 126 are estimated measures in light of the fact that the categorization performed by a categorizer 116 is often not absolutely accurate. For example, the accuracy of a trained categorizer can be impacted by the quality of training cases used to train the categorizer. As explained further below, to compensate for inaccuracies of the categorizer 116, calibration of the quantifier 126 is performed based on some indication of the ability of the categorizer 116 to categorize cases in a data set or based on the statistical distribution of scores issued by the categorizer 116 on cases.

The quantifier 126 is able to display the quantification measures it computes either numerically or graphically. Also, the quantifier 126 is able to generate one or more reports 138 that present these quantifications. The reports 138 optionally also provide comparative quantifications, such as providing a comparison of cases in different data sets or in different partitions of one data set.

As discussed above, the analysis tool 16 provides an interactive software package that simplifies the processes of identifying new categories for cases (unlabeled cases 110 and/or labeled cases 111) in the data set(s) 22; developing training cases for training the categorizer; training the categorizer; categorizing cases; quantifying the categorized cases; and providing information regarding a trend of one or more categories.

Figure 2B:
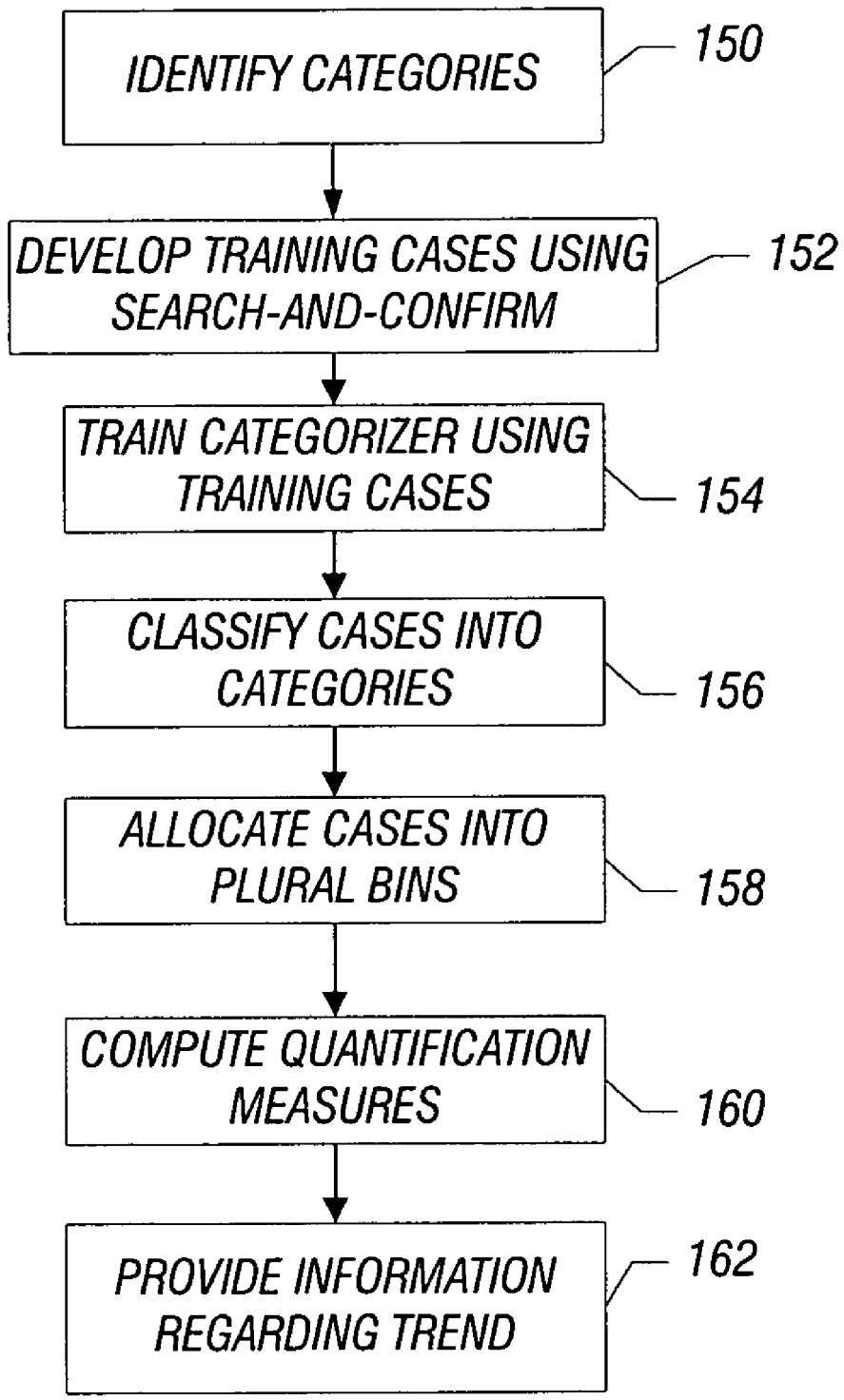
FIG. 2B is a flow diagram of a process performed by the analysis tool in the analysis server of FIG. 2A, in accordance with an embodiment.

A general flow of general tasks performed by the analysis tool 16 is discussed in connection with FIG. 2B. These tasks are described in greater detail below with respect to FIGS. 5A-5G. Using the analysis tool 16, categories (e.g., customer support issues) that are pertinent to an organization can be identified (at 150). Training cases are then developed (at 152) using the search-and-confirm mechanism, and the training cases are used to train (at 154) the categorizer 116. Developing training cases includes generating new training cases or modifying training cases. Cases (e.g., calls received by customer support representatives) are classified (at 156) by the trained categorizer 116 into the categories identified. The cases being classified can be cases in "recent" history (e.g., cases received in the past month, quarter, year, etc.).

After classification, the cases are allocated (at 158), such as by sorting or dividing, into multiple ordered bins (e.g. time windows, locations, altitude ranges, etc.). For cases in each category and in each bin, a quantification measure (or quantification measures) is(are) computed (at 160). The analysis tool 16 then provides (at 162) information regarding the trend of the quantification measures in the ordered bins associated with each category being studied. The provided information regarding the trend of each category being studied can be depicted visually, such as in the chart of FIG. 4.

Figure 3:
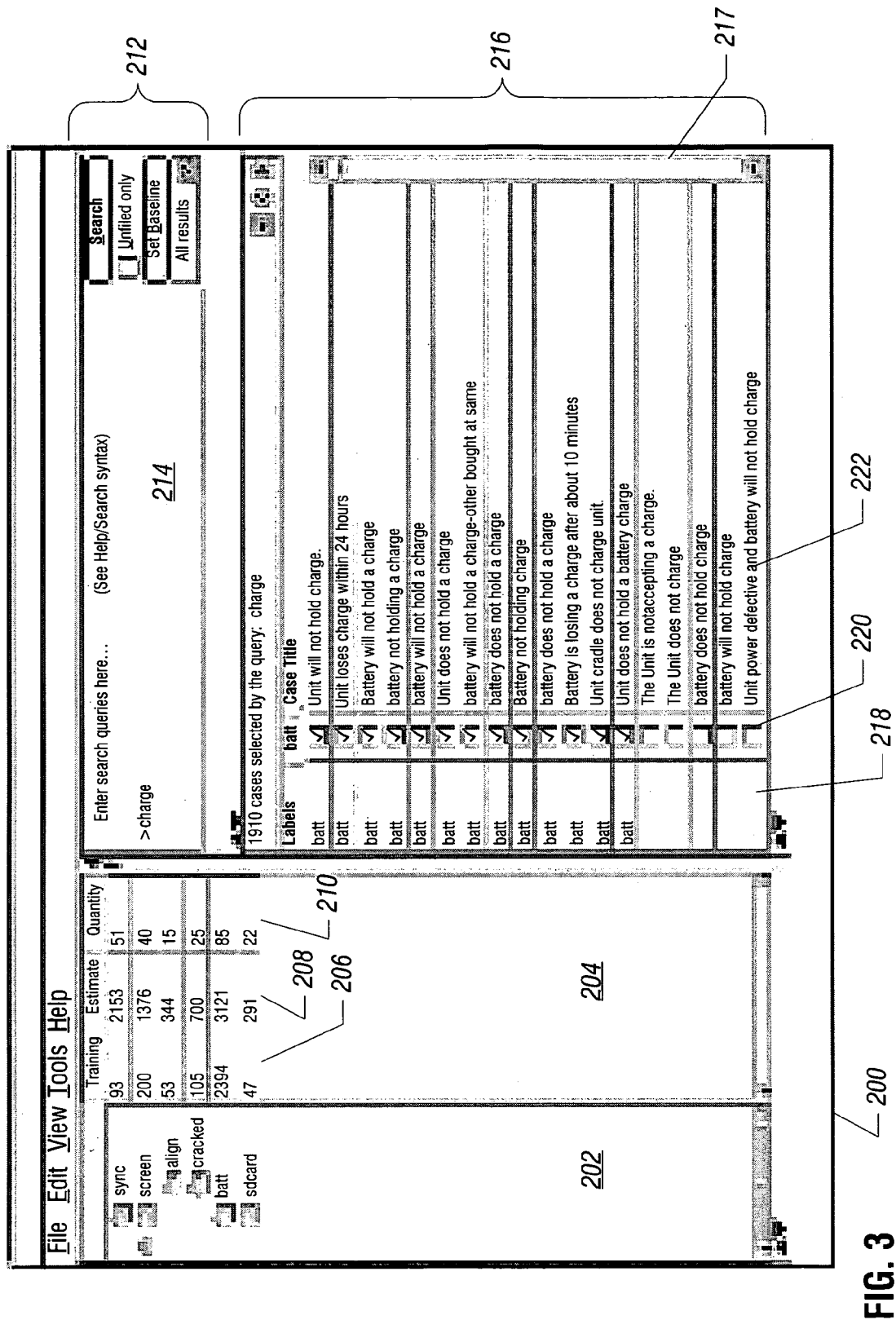
FIG. 3 illustrates graphical user interface screens for presenting information associated with the analysis tool, according to an embodiment.

FIG. 3 illustrates an example of a GUI screen 200 that can be displayed in the user interface 118 (FIG. 2A), for performing a search-and-confirm procedure according to some embodiments. The content of the GUI screen 200 is provided by one or more of the search engine 102, confirmation module 122, manager module 101, training module 14, category editor 126, categorizer 116, and quantifier 126.

The GUI screen 200 includes a first frame 202 that displays the hierarchy of categories (also referred to as "classmap") that is being built using the analysis tool 16 of FIG. 2A. In the example depicted in FIG. 3, the four main categories include "sync," "screen," "batt," and "sdcard." Note that any of these four categories can include subcategories. For example, the "screen" category has subcategories. Examples of subcategories of the "screen" category include the "cracked" subcategory, and the "align" subcategory. The subcategories can further include subcategories to any desired depth.

The GUI screen 200 also includes a second frame 204 with a "training" column 206 to display the number of cases that have been identified by a user (either directly or by inference) as being positive cases for a given category. The "Training" column 206 lists the number of cases for each of the "sync," "screen," "batt," and "sdcard" categories. For example, in the "Training" column 206, the "sync" category has 93 cases, the "screen" category has 200 cases, the "batt" category has 2,394 cases, and the "sdcard" category has 47 cases.

Another column in the second frame 204 is an "Estimate" column 208, which displays the estimated number of cases identified by the quantifier 126 as belonging to each of the categories and subcategories. A third "Quantity" column 210 lists an estimated sum of some data field of the cases in each category, such as time spent on cases that belong in the category or cost of handling the cases in the category. The values in the "Quantity" column 210 are also provided by the quantifier 126. As other examples, the "Quantity" column 210 can indicate costs or percentages of volume of cases.

Another optional column in the second frame 204 can indicate the perceived quality of the current categorizer with respect to each particular category. Examples of information pertaining to the measure of the quality of the categorizer 116 that has been trained using training information developed according to some embodiments includes: a true positive rate (the likelihood that an item in a category will be identified by the categorizer to be in the category); a false negative rate (the likelihood that an item in a category will be identified by the categorizer to be not in the category); a true negative rate (the likelihood that an item that is not in a category will be identified by the categorizer to be not in the category); a false positive rate (the likelihood that an item that is not in a category will be identified by the categorizer to be in the category); an accuracy measure (the likelihood that an item will be correctly identified to be or not to be in a category); a recall measure (same as true positive rate); a precision measure (the likelihood that an item identified to be in a category actually is in the category); a bi-normal separation measure (a measure of the separation between the true positive rate and the false positive rate); an information gain measure (a measure of the decrease in entropy due to the categorizer); a lift measure (a measure of an increase in, e.g., response rate if only the cases the categorizer is most confident about are processed); a measure of stability under cross-validation (measure of the likelihood that the categorizer has or has not overfit the training information by learning to recognize individual cases rather than learning generalities that apply to unseen data); a measure of an area under an ROC (receiver operating characteristic) curve (area under a curve that is a plot of true positive rate versus false positive rate for different threshold values for a categorizer); a number of training cases; a percentage of target training size (same as number of training cases, except with the added notion that a user has indicated a desire to see a minimum number of cases for every category); an F-measure (a parameterized combination of precision and recall); a total cost (an expected aggregate cost over analyzed cases considering separate individual costs for the true positives, true negatives, false positives, and false negatives); and an average cost (similar to total cost, except averaged over the number of cases).

A search frame 212 is also displayed in the GUI screen 200. The search frame 212 includes a search area 214 in which a user can enter a query for performing the scooping process. As part of the scooping process, the user-provided query is submitted to the search engine 102 (FIG. 2A) to retrieve a number of cases that will be displayed in a display frame 216. In the example shown in FIG. 3, the query contains the search term "charge," which means "find cases that contain a word in a case title or elsewhere that contains the word charge."

The display frame 216 displays a summary (e.g., title) of some or each of the cases identified by the search based on the query entered in the search frame 212. Note that each case is associated with several pieces of information, with the title being one of the pieces. In other implementations, other pieces of information associated with the cases can be displayed. In the example of FIG. 3, the leftmost column 218 of the display frame 216 indicates the category (in text form) of each of the corresponding cases. In a second column 220 of the display frame 216, user-selectable boxes are provided to allow a user to confirm whether or not the corresponding cases belong to the category displayed, in this case, the "batt" category. The user-selectable boxes are clickable by a user to perform confirmation or disconfirmation. Also, the categorizer 116 can provide an initial guess as to whether or not the displayed cases belong to the category (by displaying a check mark or leaving the user-selectable box blank).

If the result cases do not fit in one page, a scroll bar 217 is provided to enable the user to scroll to the remaining cases. Alternatively, a user may specify that the GUI screen 200 displays a set of randomly selected cases that fit within the display frame 216, such that the scroll bar 217 would not have to be used.

In the third column 222 of the display frame 216, a summary of the case, such as the case title, is illustrated. For example, the summary provided can have been previously entered by a customer support representative when answering customer calls. Even though the displayed summaries may contain mis-spellings, grammatical errors, and abbreviations, a user looking at each summary can quickly ascertain whether each respective case is associated with the category in question.

Note that each of the case titles displayed in the third column 222 of the display frame 216 contains the word "charge." Based on the displayed case title, a user can select or de-select each user-selectable box in the second column 220. In other implementations, other types of summaries can be displayed in the third column 222 to provide information that the user can use to select or de-select boxes in the second column 220. Selection of a box indicates that the user has confirmed that the particular case belongs to the category. On the other hand, when a user de-selects a box in the second column 220, that is an indication that the corresponding case does not belong to the category in question (that is, the user has disconfirmed that the case belongs to the category).

In a different embodiment, instead of displaying just one category, the display frame 216 can display multiple categories with fields that are user-selectable to confirm or disconfirm whether a case belongs to the categories. A confirmed case can be added to a positive training set, while a disconfirmed case can be added to a negative training set. The positive and negative training sets are used to train the categorizer.

As a user labels cases as belonging (or not belonging) to particular categories based on input to the confirmation module 122, training cases 112 (positive and/or negative training cases) are added or modified, such as by the confirmation module 122 or by some other module in the analysis tool. As the training cases 112 are added, the categorizer 116 is trained concurrently. The training of the categorizer 116 as positive training cases or negative training cases are added can be performed in the background (according to some embodiments) so that the training (or retraining) of the categorizer 116 does not interfere with the search and confirm processes used for identifying training cases. The trained categorizer is installed atomically once the training is complete. If the user makes changes to the categories while the categorizer is training, the training can be stopped and restarted with the modified categories. Note that the term "training" refers to either the first training of a categorizer or a retraining of the categorizer.

Also, as categories are added, modified, and/or deleted, the categories displayed in the first frame 202 are changed by the category editor 132 (FIG. 2A). During the search, confirm, and training processes, the "Estimate" and "Quantity" columns 208 and 210 in the second frame 204 are also continually updated by the quantifier 126.

FIGS. 5A-5G show flow diagrams of processes that involve a search-and-confirm procedure, training procedure, a quantifying procedure, and a trend detection procedure, according to an embodiment.

Figure 5A:
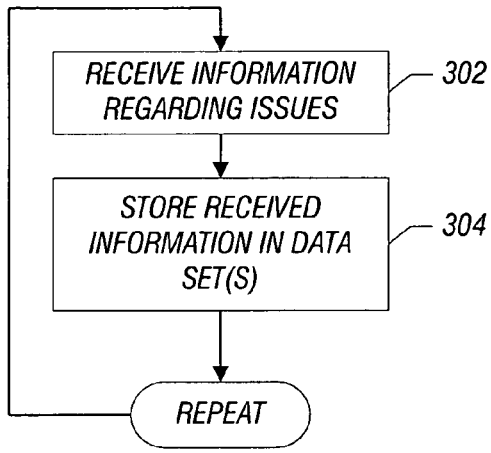

As shown in FIG. 5A, the data collector 15 (FIG. 2A) receives (at 302) information regarding various issues, which information is received from one or plural call agent stations 10 (FIG. 1) or from other data sources. The data collector 15 stores (at 304) information regarding issues in a data set (or plural data sets).

Examples of the types of information that are received and stored include information such as the time and duration of call; information about the product being called about, replacement parts ordered, compensation offered, or repair people sent; information automatically gathered from a computer of a customer; uniform resource locators (URL(s)) or other resources visited and documents consulted in attempting to solve the problem; linked information on the demographics of the customer (e.g., location, age, gender, technological sophistication, loyalty, generated revenue, etc.); call agent-entered description of the state-of-mind of the customer; description of interaction between call agents and customers; call agent selection of a category or problem based on a call; transcripts or recording of on-line chat sessions or telephone conversations; call agent-written short summaries of a problem; customer e-mail messages; records of pages visited on a web site (such as on-line documents viewed by customer or call agent); outputs from a diagnostic program; data stored in a database (e.g., data relating to a prior support call, information relating to a purchase, and demographic information of a customer); computer files received from a customer; survey data; data received by a monitoring device; and others.

Steps 302 and 304 are repeated as additional information regarding issues are received.

Next, a search-and-confirm procedure (FIGS. 5B-5C) is performed for the purpose of developing training cases for categories associated with the unlabeled cases. The training cases is used to train one or plural categorizers 116 (FIG. 2A).

The analysis tool 16 reads an initial hierarchy of categories (at 310). One way of creating the initial hierarchy categories is based on user input. In one scenario where training cases are to be developed for a new project, a set of categories may not yet exist. In this scenario, a user can create one or a few categories as the starting point. An expert may create the categories based on a preconceived notion of the relevant categories (such as problems) associated with a particular project. Alternatively, the expert may create the one or few categories based on prior experience or common knowledge of the expert. For example, it may be well known that a product has problems with battery life, wireless connectivity, and keys following off. In a second approach, an expert may "eyeball" cases by scooping random samples and seeing which problems jump out at the expert. A user or expert can add, delete, or modify categories using the category editor 126 (FIG. 2A).

Alternatively, instead of relying on a human user or expert, an automated module in the analysis tool 16, can be used to examine the unlabeled cases 110 and determine based on this examination one or plural possible categories. For example, one technique that can be used by such a module is a cluster-detecting technique based on a clustering algorithm to identify groupings of cases. These groupings of cases identified are reviewed by a user or expert to determine which categories are appropriate to add to an initial set of categories. Note that this initial set of categories provided (at 310) does not have to be highly accurate categories, nor do these categories have to survive the process of developing the categories. The initial set of categories merely provides a starting point.

In a different scenario, there may already be a set of extant categories that can be used as a starting point for further development of training cases.

After one or a few initial categories have been identified (at 319) for the purpose of searching and confirming, the scooping process can begin. To start the scooping process, a user enters a query relating to a category into the search area 214 of the GUI screen 200 (FIG. 3). A query relates to a category if the query contains search term(s) for finding cases that belong to the category. Note that a query relating to one category can also relate to other categories as well; in other words, in some scenarios, a query can contain search terms to find cases belonging to multiple categories. The query, received (at 320) by the search engine 102 (FIG. 2A), can be in any of a number of formats, including a Boolean expression, a structured query language (SQL) query, or some other type of query. The search engine 102 can also have the capability of matching search terms specified by the query with related terms, such as synonyms. The related terms that are to be matched to the search term specified in the query can be grouped into a collection of terms. A case containing a term that matches any of the collection of terms is considered to be a match by the search engine 102.

In response to the query, the search engine 102 identifies (at 322) the matching set of cases and displays (at 324) the identified set of cases in the user interface 118 (FIG. 2A). As depicted in the example GUI screen 200 of FIG. 3, the displayed summary of the matching cases includes numbers, dates, and short strings, with a single line per case, in a table. Alternatively, the identified cases may be displayed in two-dimensional or three-dimensional graphs, or in other formats. Optionally, a user can also access information in addition to the displayed information, such as by clicking on a link. Additionally, the displayed information includes the category (or categories) that a user (or the categorizer) has associated with the case (either based on an earlier training set or based on a prediction by the categorizer).

As noted above, the submission of the query, identification of cases matching the query, and the display of the cases is part of the scooping process. Typically, the scooping process has been performed with a hypothesis in the form of "cases that match this query should be training examples for category C."

After the cases have been displayed by the search engine 102, then the confirmation module 122 can receive (at 326) user confirmation or disconfirmation. For example, some of the cases may have been identified or inferred as being or not being in the category (or categories) in question. In the example of FIG. 3, some of the user-selectable boxes in column 220 of the display frame 116 can have been checked based on this previous identification or inference.

In an embodiment, the categorizer can determine whether a matching case should be indicated as belonging to a category by computing a confidence indication. The confidence indication is compared to a predefined threshold, and if the confidence indication is greater than the predefined threshold, the categorizer identifies the matching case as belonging to the category.

The user next goes through the displayed cases and either confirms or disconfirms by respectively checking the box (or leaving the box checked) or un-checking the box (or leaving the box un-checked) in the column 220. Note that a case can belong to more than one category, so that a scoop for one category may return cases that have already been labeled as belonging to another category. Note that check boxes constitute one example implementation for confirming or disconfirming that a case belongs to a category. There are numerous other techniques in other implementations, including techniques to check plural boxes at the same time.

For those cases that have been indicated as belong to the category in question (based on user selection of the box in column 220 in FIG. 3), the confirmation module 122 modifies (at 328) the positive training set by adding such cases to the positive training set for the category. For those cases that have been incorrectly matched, which are cases that the categorizer 116 initially identified as belonging to the category but which the user has disconfirmed as belonging to the category, the confirmation module 122 modifies (at 328) the negative training set by adding such cases to the negative training set for the category. Optionally, when the user disconfirms a case as belonging to a first category, the user can confirm that the case belongs to another category (although the user does not have to). The positive training set of cases and negative training set of cases are part of the training cases 112 in FIG. 2A. Note that there can be plural sets of positive cases and plural sets of negative cases for respective categories.

Steps 319-328 are repeated to develop training cases for other categories or to more fully develop training cases for a current category.

Figure 5C:
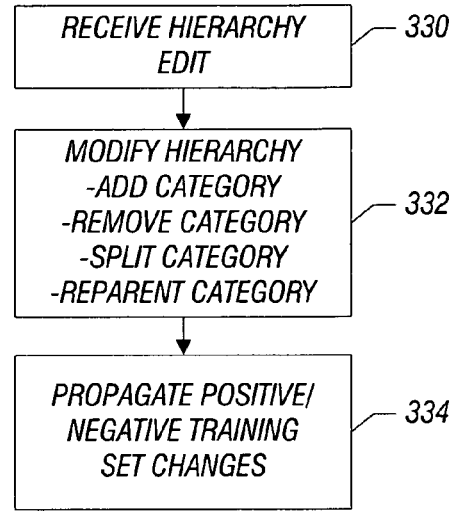
Figure 5B:
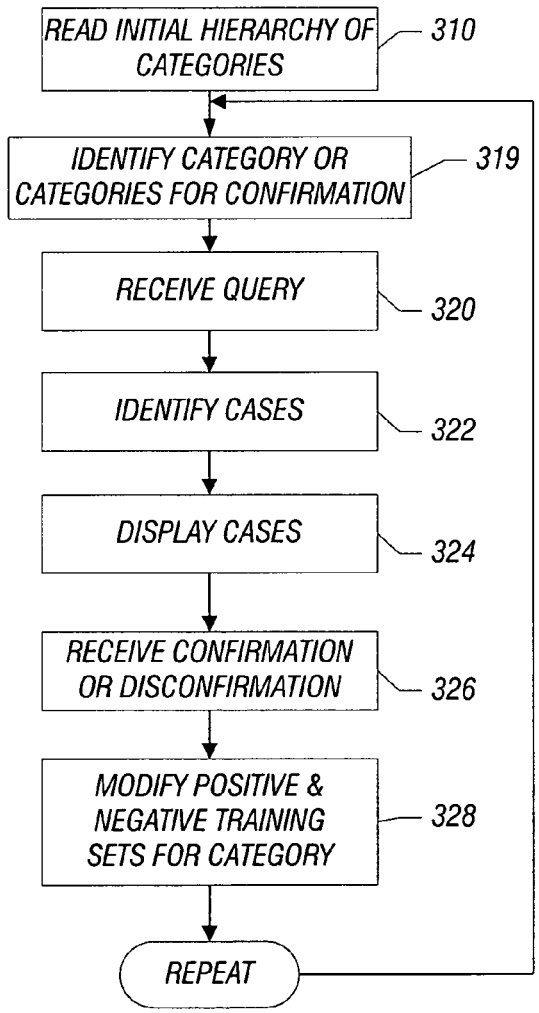

As part of the process of confirming or disconfirming cases, the user may realize that a new category should be created. In the example depicted in FIG. 3, the user can do this using one of the menu items of the GUI screen 200, such as the "File," "Edit," or "Tools" menu items, or some other control element in the GUI screen 200. As shown in FIG. 5C, the category editor 126 receives (at 330) an edit input (through the GUI screen 200) regarding a newly created category (or subcategory), a modified category (or subcategory), or a deleted category (or subcategory). In response to user input adding a new category (or subcategory), modifying a category (or subcategory), or deleting a category (or subcategory), the category editor 126 modifies (at 332) the hierarchy 124 of categories (FIG. 2A). In the present discussion, it is noted that adding, deleting, or modifying a category refers to adding, deleting, or modifying a category and/or a subcategory. The user can also split a category (into multiple categories) or reparent a category (indicate one category as being a parent of another category).

The modification of the hierarchy 124 of categories can result in changes of the positive and negative training sets, which changes are propagated (at 334).

Since any added or modified category is based on a user's examination of the summaries of cases listed in response to the query, the added or modified category is likely to be semantically meaningful (the label for the category or subcategory is descriptive of the corresponding problem or other event or item). Also, the set of categories created is not biased by any requirement that all cases have to be labeled or that all cases have to be assigned to a single category.

As discussed, as the user performs confirm/disconfirm and as categories or subcategories are added/modified/deleted, changes occur in the positive and negative training sets, which are propagated (at 340) through the hierarchy 124 of categories, as depicted in FIG. 5D. The display of the number of cases per category is updated (at 342) in the column 208 of the frame 204 (FIG. 3).

As the training cases 112 are being updated by the scooping and confirming processes described above, the categorizer 116 is trained (at 346) in the background for categories whose positive or training sets have changed. Optionally, the retraining (at 346) can be delayed, by use of a timer involving optional steps 343 and 344. The timer is set or updated (at 343) to expire after a predetermined amount of time. Any change to the training cases will cause the process to loop back to step 340 (which will cause the timer to again be set or updated at 343). After some period of stability (a period during which no changes occur) has been detected, the timer expires (at 344), which allows the categorizer retraining (at 346) to be performed. Checking for stability at 344 avoids the situation where many successive changes in the positive and training sets in a short period of time caused by user confirming/disconfirming or category modification causes the retraining to restart many times. The retraining of the categorizer 116 can occur generally concurrently with the scooping and confirming processes so that the user can continue to perform the scooping and confirming processes even while the categorizer is being trained, subject to the training module 114 (optionally) waiting for expiration of the timer to ensure some period of stability. An output provided by the scooping process, confirming process, and training process described above is a categorizer, or plural categorizers.

The retrained categorizer is invoked to re-categorize or relabel (at 348) the cases. Also, the quality of categorization or labeling performed by the categorizer can be determined (at 350) (by measuring the categorizer), and a measure of this quality can be displayed (at 352). The quality measures of a categorizer are listed above. If the quality measures of the categorizations performed by the trained categorizer indicate that the categorizations are either incorrect or of insufficient confidence (quality measure being less than a predefined threshold), the categorizer can be retrained again.

Steps 340-352 are repeated as positive and/or negative training sets are modified for the various categories.

As depicted in FIG. 5E, at some point (which can be during or after the categorizer(s) has been trained and has been invoked to categorize cases in the one or more data sets 22), the quantifier 126 is created (at 360). The quantifier 126 is also calibrated (at 362) to take into account any inaccuracies present in the categorizer 116. As noted above, a categorizer usually does not perform categorization of cases with perfect accuracy. An indication of quality of a categorizer that has been trained is provided by one or more of the quality measures listed above. The quantifier 126 is calibrated based on the quality measures.

In one embodiment, to calibrate the quantifier 126 with respect to a category C, the analysis tool 16 determines the fraction (TPR) of the time that the categorizer is correct when presented with a case that should be categorized in a category C (also referred to as the true positive rate), and the fraction (FPR) of the time that the categorizer is wrong when presented with a case that should not be categorized in the category C (also referred to as the false positive rate). Assuming that a data set includes a total of T cases, of which N cases have been categorized in the category C, then the calibration to be performed by the calibrated quantifier 126 on the value N is as follows:

$$N'=(N-FPR \cdot T)/(TPR-FPR),$$

where N' is the calibrated N value.

Similar fractions representing true positive rates and false positive rates are also maintained for the other categories to enable calibration of the quantity values for other categories. Other techniques for calibrating a quantifier/categorizer are described in U.S. Ser. No. 11/080,098, entitled "A Method of, and System for, Classification Count Adjustment," filed by George H. Forman et al., on Mar. 14, 2005. In other embodiments, any other technique of calibrating a quantifier or adjusting its output quantification, especially by observing the behavior of its underlying categorizer(s), may also be used.

In yet another calibration technique, a score associated with each of a group of cases is obtained from the categorizer. A statistical distribution is computed based on the scores. The quantification measure is adjusted based on the statistical distribution.

The calibrated quantifier 126 is used to update (at 364) quantification measure(s) for each of the categories. The calibrated quantifier 126 produces calibrated quantification measure(s). The categorizer(s) 116 associated with the quantifier 126 provides information regarding the categorized cases to the quantifier 126 to enable the quantifier 126 to produce the quantification measure(s). Note that the quantification process can proceed concurrently with the search-and-confirm and the training processes discussed above. Thus, the analysis tool 16 may present running estimate(s) of the quantification measure(s) in each category. The quantifier 126 displays (at 366) the updated quantification measures, such as estimated number of cases and quantity estimates (columns 208 and 210 in the frame 204 of FIG. 3).

Steps 362-366 are repeated to continually update quantification measure(s) as more cases are received and the categorizer 116 is retrained.

As discussed above, the trend detector 140 in the analysis tool 100 is able to detect a trend of at least some of the categories (e.g., customer support issues). As depicted in FIG. 5F, the trend detector 140 defines (at 410) multiple bins based on one or more criteria. As examples, the one or more criteria include a time criterion, a product type criterion, a product number criterion, a product age criterion, a size criterion, a speed criterion, a cost criterion, a warranty type criterion, a customer type criterion, a customer interaction type criterion, an altitude criterion, a temperature criterion, a humidity criterion, another atmospheric condition (e.g., pressure) criterion, a location criterion, a usage criterion (e.g., number of pages printed, mileage, number of landings), a customer income level criterion, a purchase price criterion, or any other criterion.

If the criterion is a time criterion, then the bins are time points or time windows, where the trend analysis is performed for predefined time points or time periods (e.g., weekly periods, monthly periods, quarterly periods, etc.). Time windows can be overlapping or non-overlapping. One type of overlapping time windows is sliding time windows. As an example, a first sliding window can be defined as including Day 1 through Day 7, a second sliding window can be defined as including Day 2 through Day 8, a third sliding window can be defined as including Day 3 through Day 9, and so forth. In the sliding window example, each sliding window is considered a bin.

If the criterion for defining the bins is product number or product type, then each bin contains cases for a specific product number or product type. Similarly, if the criterion for defining the bins is altitude, then each bin can be defined by a range of altitude levels (e.g., bin 1 includes ground level to 5,000 feet, bin 2 includes 5,001 feet to 10,000 feet, and so forth).

The bins are then ordered (at 412) according to the corresponding criterion. If the criterion is a time criterion, then the ordering of the bins is based on time so that a trend over time of cases in the multiple bins can be detected. Alternatively, if the criterion used is an altitude criterion, then the bins are ordered according to altitude so that a trend at different altitudes (e.g., use of a product when flying versus use of a product at sea level) can be detected.

Cases that are under analysis are then allocated to the bins (at 414) by the trend detector 140. The cases under analysis can be recent cases that have been received in the latest month, quarter, or other time period. Note, however, for the purpose of detecting a trend, the cases under analysis can include cases over longer periods of time (e.g., one or several years). The cases under analysis have been classified into various categories by the trained categorizer (see FIG. 5D).

For each bin, a quantification measure (or multiple quantification measures) is (are) computed (at 416) by the quantifier 126 for cases in each category. As an example, a quantification measure can be the number of calls in each bin (e.g., a time window). Other quantification measures (including those listed further above) can be used as other forms of metrics in other implementations. Thus, for each bin, multiple quantification measures can be computed for corresponding categories. For example, a first number of calls for a first category (e.g., battery problem) can be computed, a second number of calls for a second category (e.g., display failure) can be computed, and so forth. Alternatively, the trend detector 140 can focus on just one category so that a single quantification measure is computed for each bin.

The trend detector 140 then produces (at 417) an output (for presentation to a user) that contains indications of the quantification measures for each category in the ordered bins (e.g., time series, altitude ranges, product models, etc.). The output enables determination of a trend for each category over the ordered bins. As examples, the output can be a text-based report (e.g., a series of numbers representing the quantification measures for each category), a graph (such as a pie chart, bar chart, stacked bar chart, line chart, scatter plot, bar-and-whiskers plot), or a report according to any other format (e.g., a table).

Note that there are several types of trends: (1) trends that vary between increasing, decreasing, and flat; (2) a steadily increasing or decreasing (steadily changing) trend; and (3) a trend characterized by a sharp increase or decrease (sharp change). A steadily changing trend can either be a gradually increasing or decreasing trend, or a strongly increasing or decreasing trend. A trend according to type (1) usually occurs during normal operation.

However, a trend according to type (2) or (3) usually results from some underlying factor (such as a systematic change). A trend according to type (2) or (3) is usually an indication that something unexpected has occurred (e.g., product defect, third party new software release, etc.). Consequently, detection of a trend according to type (2) or (3) is usually an indication that an organization or user should focus resources to address an issue (or issues) associated with a category (or categories).

As further depicted in FIG. 5F, the trend detector 140 can also be invoked to extrapolate (at 418) the trend into subsequent ordered bins. For example, if the ordered bins are time windows, then the trend can be extrapolated into the future based on a model developed from the trend. If the ordered bins are altitude bins, then the extrapolation can be provided into higher altitudes. Extrapolating a trend into subsequent ordered bins allows an organization or user to determine, for example, whether a problem that is currently a big problem will remain a big problem in the future. The extrapolated trend can be used by the organization or user to determine whether the organization or user should expend resources to address the issue associated with the category.

Based on the detected trends associated with several categories, the ranking module 106 can rank (at 419) the categories. For example, a category can be ranked higher if a trend indicates any of the following: a strong trend upwardly or downwardly of a quantification measure associated with the category (e.g., categories associated with trends changing at a more rapid rate can be ranked higher); a sharp change in the trend; and extrapolation of the trend into subsequent ordered bins (e.g., into the future) indicates increasing magnitude of the quantification measure (e.g., future predicted values of the quantification measure based on the trend indicates an increasing problem). More generally, ordering of the categories is based on at least one of: (1) relative rates of change of the trends of respective categories, (2) presence or lack thereof of sharp changes in the trends of respective categories, and (3) relative magnitudes of future quantification measures of respective categories based on the trends.

The ranked categories can be listed in a report (which can include a chart, table, or other output) that can be provided to a user. The content of the report can be used by the user to determine which categories should be allocated resources to address.

Figure 4:
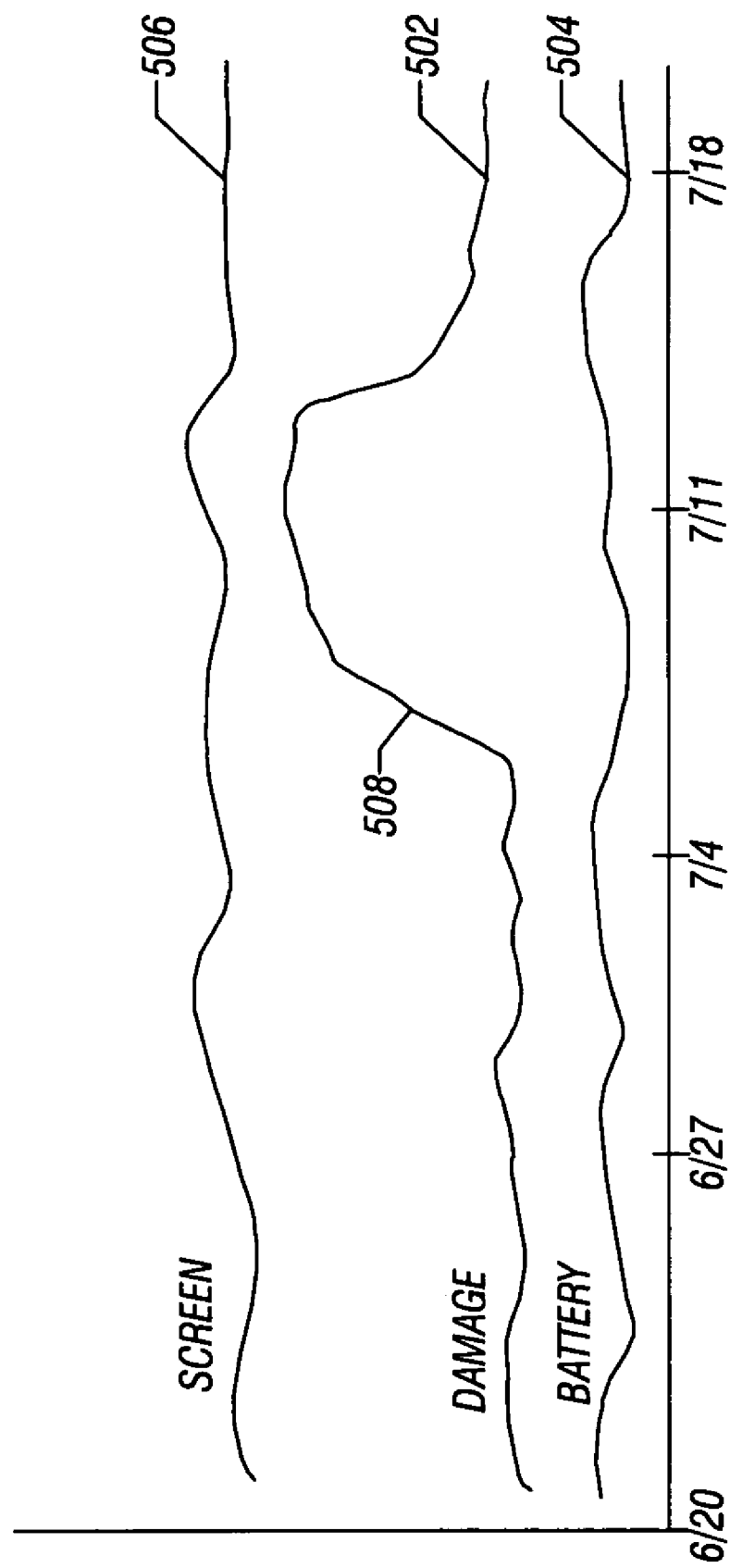
FIG. 4 is a chart illustrating quantification measures over time for several categories, the chart presentable by the analysis tool according to an embodiment.

FIG. 4 illustrates a chart that depicts changing quantification measures over multiple ordered bins, which are daily time windows in the depicted example (a daily time window is a time window having a length of one day). The quantification measures for three categories are depicted in FIG. 4. The graphs 502, 504, and 506 correspond to respective quantification measures calculated (at 416) in FIG. 5F. Graph 502 relates to a "damage" category, graph 504 relates to a "battery" category, and graph 506 relates to a "screen" category. In the example of FIG. 4, a sudden spike occurs (at 508) in the graph 502 right after July $4^{th}$. This sudden change in the quantification measure relating to the "damage" category is an indication that some special event has occurred. In this case, the sudden increase in cases in the "damage" category can be due to people taking a particular product to various activities during the holiday, which can cause an increased occurrence of damage to the product. The analysis tool 16 can highlight regions of each of the graphs 502, 504, and 506 that a user should focus on. For example, the spike portion (starting at 508) of the graph 502 can be highlighted to indicate that some unexpected event may have occurred. The highlighting of portions of each graph can also be based on change-point detection performed by the change detector 142 (FIG. 2A), as described further below. For example, change points (indicating that a systematic change has occurred) can be highlighted.

As depicted in FIG. 5G, change-point detection as performed by the change detector 142 is applied to quantification measures collected in ordered bins for determining a trend. To detect whether there has been a change in the quantification measures calculated by the trend detector 140, a series of quantification measures for respective bins are received (at 420) by the change detector 142. The change detector applies (at 422) a change-point detection algorithm, such as the CUSUM algorithm, GLR algorithm, or some other algorithm, to the series of quantification measures in the ordered bins.

The change detector 142 determines (at 424) whether a systematic change has occurred. This determination can be performed by comparing each of the cumulative sums calculated by the cumulative sums algorithm against a threshold. If a cumulative sums crosses a threshold, then that is an indication that a systematic change has occurred. The change-point detection algorithm applied by the change detector 142 also enables the change detector 142 to find a change point, which is the point (e.g. a time point) at which the systematic change occurred. Examples of change-point detection algorithms that can be used by the change detector 142 include those described in U.S. Ser. Nos. 11/119,037, entitled "Detecting Change in Data," by Jerry Z. Shan; 11/117,989, entitled "Performing Quality Determination of Data," by Jerry Z. Shan; 11/118,832, entitled "Determining a Time Point Corresponding to a Change in Data Values Based on Fitting With Respect to Plural Aggregate Value Sets," by Jerry Z. Shan; U.S. Patent Application Publication No. 2005/0096866, entitled "Techniques for Monitoring a Data Stream." by Jerry Z. Shan et al.; and U.S. Patent Application Publication No. 2006/0173559, entitled "Methods and Systems for a Prediction Model," by Evan Kirshenbaum et al.

Identifying the change point along with providing the indication that a systematic change has occurred allows an organization to go back to the point at which the failure (or some other issue) occurred to better understand the issue. The indication of the systematic change and identification of the change point can be output in a user interface (such as a graphical user interface) or provided in some other report.

As noted above, tracking a trend of a category (or plural categories) also allows for an organization or user to determine whether an action with respect to an issue associated with the category should be taken. For example, an action can be taken if the trend indicates that the issue associated with the category is worsening. After the action is taken, the steps of FIGS. 5A-5F are repeated, and a new trend is determined for new cases received after the action has been taken. Comparison of the new trend with the previous trend indicates an effect of the action with respect to the category, such as whether an action taken with respect to the category has resulted in a positive change (e.g., a decrease in the measured quantification measure(s) associated with the category that indicates the issue associated with the category has improved).

An "action" taken with respect to a category includes a fix or some other action. Examples of actions that can be taken with respect to a category include one or more of: allocating a sum of money (or otherwise defining a budget); allocating a physical resource (e.g., equipment); hiring a person; assigning a task to a person; writing a document (such as a help document); modifying an existing document; identifying a document; altering availability of a document (such as to make the document more widely available such as posting the document on a web site); altering an organization of a web site; modifying a design of a product; modifying a packaging of a product; modifying a manufacturing process for a product; creating a software program; modifying a software program; creating a patch for a software program; contacting a customer, vendor, supplier, employee, or partner; modifying a marketing campaign; changing response time of service providers; training service personnel; discontinuing efforts that are no longer required; changing the process of writing and delivery of software programs; taking actions with reference to seasonal fluctuations; provide reports to customers regarding how issues are being monitored and addressed; and other actions.

Examples of other events that may affect a particular issue associated with a category include external events (associated with third parties) such as a new version of an operating system, upgrades of operating systems, new knowledge documentation, new hardware platforms, or any other event that can directly or indirectly affect cases associated with a particular issue.

For example, if a problem has been resolved by implementing a product fix, then the technical support call volume on the specific issue(s) can be monitored to determine whether the call volume exhibits a downward change (downward trend). The change detector 142 can be invoked to determine whether a systematic change has occurred. The downward trend along with an indication of change provided by the change detector 142 is an indication that the fix has been successful.

Alternatively, determining whether an action has been effective with respect to a category can be based on a comparison of a first trend (detected prior to the action) with a second trend (detected after the action) determined respect to a particular category.

Instructions of the various software modules described above are loaded for execution on corresponding processors. The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer, comprising:
    identifying, in response to a query relating to a category, at least one case;
    receiving an indication confirming or disconfirming that the at least one case belongs to the category;
    training a categorizer based on the received indication;
    allocating cases from a data set into plural bins; and
    for respective bins, computing quantification measures for cases belonging to the category based on output from the categorizer; and
    providing information regarding a first trend of the category over the plural bins based on the computed quantification measures.

2. The method of claim 1, wherein the plural bins comprise one of time points and time windows, the method further comprising providing a time-based graph of the quantification measures over the one of the time points and time windows to provide information regarding the first trend.

3. The method of claim 1, further comprising identifying, based on the first trend, that an issue associated with the category is changing.

4. The method of claim 3, further comprising:
    after an action is taken with respect to an issue associated with the category in response to determining that the issue associated with the category is changing based on the first trend,
    receiving additional cases,
    allocating the additional cases into additional bins,
    computing quantification measures in respective additional bins for the additional cases belonging to the category based on output from the categorizer, and
    presenting information regarding a second trend of the category over the additional bins based on the computed quantification measures in the respective additional bins.

5. The method of claim 4, further comprising determining, based on a comparison of the first trend with the second trend, an effect of the action with respect to the category.

6. The method of claim 1, wherein computing the quantification measures is performed by a quantifier in cooperation with the categorizer.

7. The method of claim 1, wherein allocating cases from the data set into the plural bins comprises allocating cases from the data set into bins based on at least one of a time criterion, a product number criterion, a product type criterion, a product age criterion, a size criterion, a speed criterion, a cost criterion, a warranty type criterion, a customer type criterion, a customer interaction type criterion, a location criterion, a usage criterion, a serial number criterion, an altitude criterion, a temperature criterion, a humidity criterion, a pressure criterion, a customer income level criterion, and a purchase price criterion.

8. The method of claim 7, further comprising ordering the plural bins according to the at least one of the time criterion, the product number criterion, the product type criterion, the product age criterion, the size criterion, the speed criterion, the cost criterion, the warranty type criterion, the customer type criterion, the customer interaction type criterion, the location criterion, the usage criterion, the serial number criterion, the altitude criterion, the temperature criterion, the humidity criterion, the pressure criterion, the customer income level criterion, and the purchase price criterion.

9. The method of claim 1, wherein providing the information regarding the first trend comprises providing the information using one or plural graphs of the quantification measures.

10. The method of claim 1, further comprising detecting a systematic change in the category using a change-point detection algorithm applied to the quantification measures.

11. The method of claim 10, wherein detecting the systematic change using the change-point detection algorithm comprises using one of a cumulative sums algorithm and a generalized likelihood ratio algorithm.

12. The method of claim 1, further comprising creating a model based on the first trend to predict future values for the quantification measures.

13. The method of claim 1, wherein allocating cases from the data set into the plural bins comprises allocating cases from the data set into sliding time windows.

14. The method of claim 1, further comprising:
    computing additional quantification measures in respective bins for cases belonging to additional categories based on further output from the categorizer;
    providing information regarding additional trends of respective additional categories over the plural bins based on the computed additional quantification measures.

15. The method of claim 14, further comprising providing information to enable ordering of the categories based on the trends.

16. The method of claim 15, wherein providing information to enable the ordering of the categories is based on at least one of: (1) relative rates of change of the trends of respective categories, (2) presence or lack thereof of sharp changes in the trends of respective categories, and (3) relative magnitudes of projected future quantification measures of respective categories based on the trends.

17. A method executed by a computer comprising:
    identifying at least one case in response to a query relating to a category;
    receiving an indication confirming or disconfirming that the identified at least one case belongs to the category;
    training the categorizer based on the received indication;
    classifying, with the trained categorizer, cases from a data set into the category; and
    allocating the cases into plural bins;
    computing quantification measures for cases in respective bins;
    providing information regarding a trend of the category over the plural bins based on the computed quantification measures; and
    determining whether an action take with respect to the category has resulted in a change of the quantification measures.

18. The method of claim 17, further comprising developing training cases based on the received indication, wherein the categorizer is trained based on the training cases.

19. The method of claim 17, wherein the trend represents an increasing or decreasing direction of the quantification measures.

20. A computer-readable storage medium storing instructions that when executed cause a computer to:
- identify, based on a query relating to a category, at least one case;
- receive an indication confirming or disconfirming that the identified at least one case belongs to the category;
- train a categorizer based on the received indication;
- classify, by the trained categorizer, cases from a data set into the category;
- divide the cases into plural bins;
- compute quantification measures for the cases in respective bins; and
- display a representation of a trend of the category over the bins based on the computed quantification measures.

21. The method of claim 1, wherein receiving the indication confirming or disconfirming comprises receiving the indication of user confirmation or disconfirmation of whether the at least one case belongs to the category.

22. The method of claim 17, wherein receiving the indication comprises receiving the indication of user confirmation or disconfirmation of whether the at least one case belongs to the category.

23. The computer-readable storage medium of claim 20, wherein receiving the indication confirming or disconfirming comprises receiving the indication of user confirmation or disconfirmation of whether the at least one case belongs to the category.

* * * * *